United States Patent
Funk et al.

(10) Patent No.: US 10,763,613 B2
(45) Date of Patent: Sep. 1, 2020

(54) BARRIER DEVICE FOR AN ELECTRICAL CONNECTOR

(71) Applicant: Deere & Company, Moline, IL (US)

(72) Inventors: Eric R. Funk, Apex, NC (US); Gregory K. Harmelink, Moorhead, MN (US); Matt D. Bartelson, Bettendorf, IA (US); Matthew Lommen, Bettendorf, IA (US); Joshua G. Payne, Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/107,673

(22) Filed: Aug. 21, 2018

(65) Prior Publication Data

US 2019/0131740 A1     May 2, 2019

Related U.S. Application Data

(60) Provisional application No. 62/579,260, filed on Oct. 31, 2017.

(51) Int. Cl.
*H01R 13/00*     (2006.01)
*H01R 13/533*    (2006.01)
(Continued)

(52) U.S. Cl.
CPC ....... *H01R 13/533* (2013.01); *H01R 13/5202* (2013.01); *H01R 43/20* (2013.01);
(Continued)

(58) Field of Classification Search
CPC .. H01R 13/533; H01R 43/20; H01R 13/5202; H02K 9/00; H02K 11/33; H02K 7/1166;
(Continued)

(56) References Cited

U.S. PATENT DOCUMENTS 4,895,536 A * 1/1990 Gingerich ............... H02K 5/148
                                                                264/272.14
5,311,398 A * 5/1994 Schirmer ............ B60R 16/0239
                                                                174/548
(Continued)

FOREIGN PATENT DOCUMENTS

CN       101222160 A       7/2008
CN       204408108 U       6/2015
(Continued)

*Primary Examiner* — Jean F Duverne
(74) *Attorney, Agent, or Firm* — Harness, Dickey & Pierce, P.L.C.

(57) ABSTRACT

A barrier device for an electrical connector is disclosed. In embodiments, the barrier device can comprise a first barrier element interposedly arranged between a substrate and a base assembly of the electrical connector. A second barrier element arranged for mating engagement with an upper surface of the substrate of the electrical connector; the second barrier element comprising a plurality of openings defined by a plurality of protruding structures that are configured and arranged to accommodate electronic components mounted to the upper surface of the substrate. The barrier device is designed such that the collective arrangement and positioning of the first barrier element and the second barrier element relative to substrate forms a thermal protection barrier and damping mechanism around the substrate.

20 Claims, 7 Drawing Sheets

(51) Int. Cl.
    *H01R 43/20*     (2006.01)
    *H01R 13/52*     (2006.01)
    *H02K 9/00*     (2006.01)
    *H02K 5/08*     (2006.01)
    *H02K 11/33*     (2016.01)

(52) U.S. Cl.
    CPC ................. *H02K 5/08* (2013.01); *H02K 9/00* (2013.01); *H02K 11/33* (2016.01)

(58) Field of Classification Search
    CPC ...... H02K 5/225; H02K 5/148; B62D 5/0403; B60R 16/0239
    USPC ......................................................... 439/485
    See application file for complete search history.

(56) References Cited

U.S. PATENT DOCUMENTS

| | | | |
|---|---|---|---|
| 6,099,324 A * | 8/2000 | Janssen | H02K 5/225 361/785 |
| 6,753,629 B2 * | 6/2004 | Doi | H02K 5/161 310/156.05 |
| 7,038,337 B2 | 5/2006 | Thomson et al. | |
| 7,859,149 B2 * | 12/2010 | Uchimura | H02K 7/1166 310/233 |
| 8,888,509 B2 | 11/2014 | Colwell | |
| 10,411,552 B2 * | 9/2019 | Yamasaki | B62D 5/0403 |
| 2012/0164489 A1 | 6/2012 | Okada et al. | |
| 2015/0364856 A1 | 12/2015 | Nakai | |
| 2016/0005031 A1 | 1/2016 | O—Regan et al. | |
| 2016/0181885 A1 * | 6/2016 | Yamasaki | H02K 11/33 180/443 |

FOREIGN PATENT DOCUMENTS

| | | |
|---|---|---|
| DE | 102015208425 A1 | 11/2015 |
| KR | 101612638 B1 | 4/2016 |
| WO | 2016178708 A1 | 11/2016 |

\* cited by examiner

BARRIER DEVICE FOR AN ELECTRICAL CONNECTOR

RELATED APPLICATIONS

This application claims priority to U.S. Provisional Application No. 62/579,260, titled "A Barrier Device for an Electrical Connector," filed Oct. 31, 2017, which is hereby incorporated by reference in its entirety.

FIELD OF THE DISCLOSURE

The present disclosure relates generally to connector assemblies, and more particularly, to a barrier device that is configured to provide a thermal protection barrier for an electrical connector.

BACKGROUND OF THE DISCLOSURE

High powered electronic devices are particularly susceptible to performance variations due to the thermal sensitivity of certain components that operate within the devices. For example, increased temperatures or extreme operating environments can lead to component failures or improper sensor readings. As such, there is a need in the art for a cost efficient and robust device that address the above concerns.

SUMMARY OF THE DISCLOSURE

According to an aspect of the present disclosure, a barrier device for an electrical connector is disclosed. In embodiments, the barrier device can comprise a first barrier element interposedly arranged between a substrate and a base assembly of the electrical connector. A second barrier element arranged for mating engagement with an upper surface of the substrate of the electrical connector; the second barrier element comprising a plurality of openings defined by a plurality of protruding structures that are configured and arranged to accommodate electronic components mounted to the upper surface of the substrate. The barrier device is designed such that the collective arrangement and positioning of the first barrier element and the second barrier element relative to substrate forms a thermal protection barrier and damping mechanism around the substrate.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION OF THE DRAWINGS

Figures 1A, 1B:
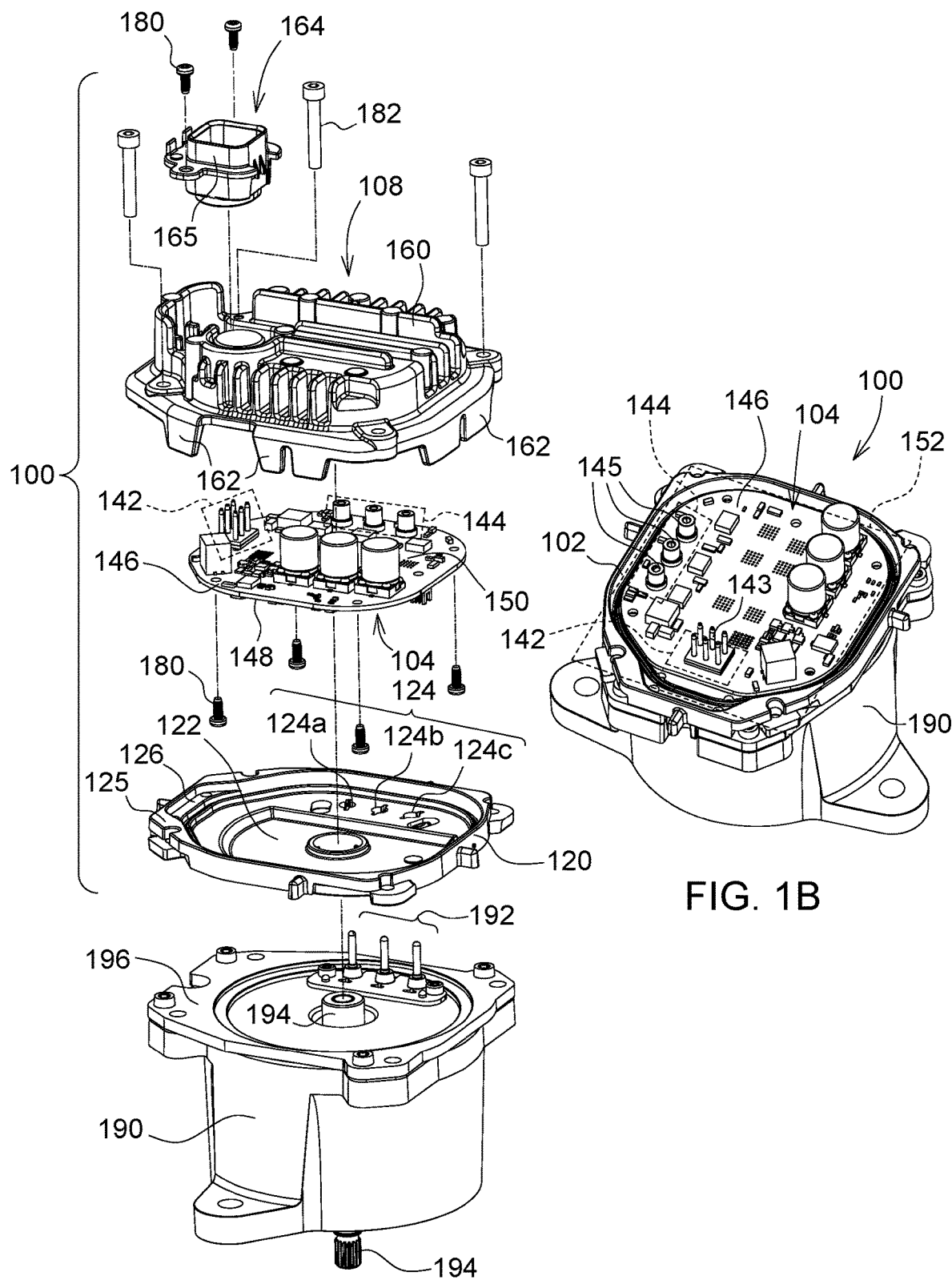
FIG. 1A is a exploded perspective view of an interconnection device according to an embodiment.
FIG. 1B is a top perspective view of the interconnection device of FIG. 1A according to an embodiment.

Referring to FIGS. 1A and 1B, an interconnection device (i.e., an electrical connector) 100 for providing an electrical connection between a motor and an inverter is shown according to an embodiment. In embodiments, the interconnection device 100 can comprise a base assembly 102, a substrate 104 having integrated electronic circuitry 152 arranged thereon, and a cover apparatus 108 each modularly arranged relative to one another for coupling to a motor 190. As shown in FIG. 1B, each of the various components of the interconnection device 100 (e.g., the base assembly 102, the substrate 104, and the cover apparatus 108) can be collectively secured to the motor 190 via fasteners 180 and 182.

In some embodiments, the base assembly 102 can comprise a body member 120 having a geometrical configuration that is sized and dimensioned for mating engagement with a mounting surface 196 of the motor 190 (e.g., an AC synchronous electric machine). The body member 120 can comprise a first receiving aperture 122 arranged in offset relation to a second receiving aperture 124. The first receiving aperture 122 can be centrally arranged within the base assembly 102 and can be sized to receive a portion of a shaft 194 of the motor 190. For example, the shaft 194 can be coaxially oriented within the first receiving aperture 122 and arranged to extend partially there through. In some embodiments, the second receiving aperture 124 can comprise a single aperture or a group of apertures such as apertures 124a, 124b, 124c, which are sized to accommodate a plurality of motor pin connectors 192 arranged on the motor 190.

A top surface 125 of the base assembly 102 can comprise a recessed channel 126 formed in or on the top surface 125 proximate an outer periphery of the body member 120 to allow for secure placement and positioning of the substrate 104. For example, the substrate 104 can be interposedly arranged between the base assembly 102 and the cover apparatus 108, and can be sized for fitted insertion into the recessed channel 126 formed within the base assembly 102.

The substrate 104, which can comprise, e.g., a printed circuit board or a silicon substrate, can be composed of an insulating material and can comprise a first surface 146 and a second surface 148 each arranged to face opposing directions of the interconnection device 100. In some embodiments, a plurality of conductive traces 150 can be etched or deposited on each of the first surface 146 and the second surface 148 to provide electrical connections between electronic components of the integrated electronic circuitry 152. For example, the integrated electronic circuitry 152 can comprise a variety of semiconductor devices, power and signal connectors, integrated circuits, and other electrical components electrically coupled to the conductive traces 150 arranged on the substrate 104. A variety of joining techniques, such as soldering, wire bonding, adhesive bonding, flip chip bonding, bumping, tape automated bonding, or other suitable techniques can be used to the mount the various components to the conductive traces 150. As will be discussed in further detail with reference to FIG. 2A, in some embodiments, the integrated electronic circuitry 152 can comprise power circuits, an inverter circuits, as well as other suitable circuit components that are arranged to receive and transmit power and signal connections via one or more connector assemblies.

As shown in FIG. 1B, the one or more connector assemblies can comprise a first connector assembly 142 and a second connector assembly 144, each comprising a plurality of connection elements 143, 145, can be arranged to project outwardly and away from the second surface 148. Each of the plurality of connection elements 143, 145 can be adjacently arranged in spaced relation to one another. In some embodiments, the connection elements 143 of the first connector assembly 142 can be arranged to transmit and receive power and communication signals to and from external devices such as a vehicle electronics unit 350 (FIG. 3) arranged on an agricultural vehicle that is arranged to tow an agricultural implement such as planter unit 500 (FIG. 5). For example, the connection elements 143 can be configured to receive a DC input power source that is inverted to an AC output for supply to the motor 190. Additionally, control commands and feedback signals can be transmitted to and from the motor 190 and the integrated electronic circuitry 152 (e.g., inverter, sensors, energy storage devices, microprocessors, etc.) via the connection elements 143.

The connection elements 145 of the second connector assembly 144 are oriented to be in respective alignment with apertures 124a, 124b, 124c of the second receiving aperture 124 arranged on the base assembly 102. Each of the connection elements 145 can comprise a cylindrical body having inner annular surfaces defining conductive channels (not shown) that are sized to precisely receive the motor pin connectors 192. For example, the connection elements 145 can be sized and dimensioned to ensure sufficient electrical contact is maintained between connection elements 145 and the motor pin connectors 192. Each connection element 143 is configured to supply a specific phase connection of, e.g., a three-phase power supply to the motor 190, wherein each connection element 145 can be interchangedly designated (i.e., signal terminal, supply terminal, ground terminal) according to design and/or specification requirements. Although in embodiments herein, a three-phase connector assembly is shown, it should be noted that, in other embodiments, fewer or more phase connections can be used.

The cover apparatus 108 can be sized to enclose the substrate 104 and the base assembly 102. In embodiments, the cover apparatus 108 can comprise an enclosure 160 having one or more coupling mechanisms 162 arranged along an outer edge of the enclosure 160 for attaching the cover apparatus 108 to the motor 190. In some embodiments, the cover apparatus 108 can further comprise a heat dissipating element which helps to facilitate removal of excess heat generated by the motor 190 and integrated electronic circuitry 152 arranged on substrate 104 (i.e., provides a path for heat transfer). A connector support 164 can be mounted to an outer surface of the cover apparatus 108 and can comprise a plurality of connector walls 165 that are arranged to define an inner open space for receiving and enclosing the connection elements 143.

As will be appreciated by those skilled in the art, FIG. 1 is provided merely for illustrative and exemplary purposes and is in no way intended to limit the present disclosure or its applications. In other embodiments, the arrangement and/or structural configuration of interconnection device 100 can and will vary. For example, as will be discussed with reference to FIG. 4, in other embodiments, the interconnection device 100 can further comprise additional structure to provide thermal and/or water ingress protection. In some embodiments, additional sensor components such as temperature or motor sensors can be mounted locally on either surface of the substrate 104. Further, the interconnection device 100 is scalable in size and performance (i.e., component sizing and power density can be increased or decreased) based on application and/or specification requirements.

Figure 2A:
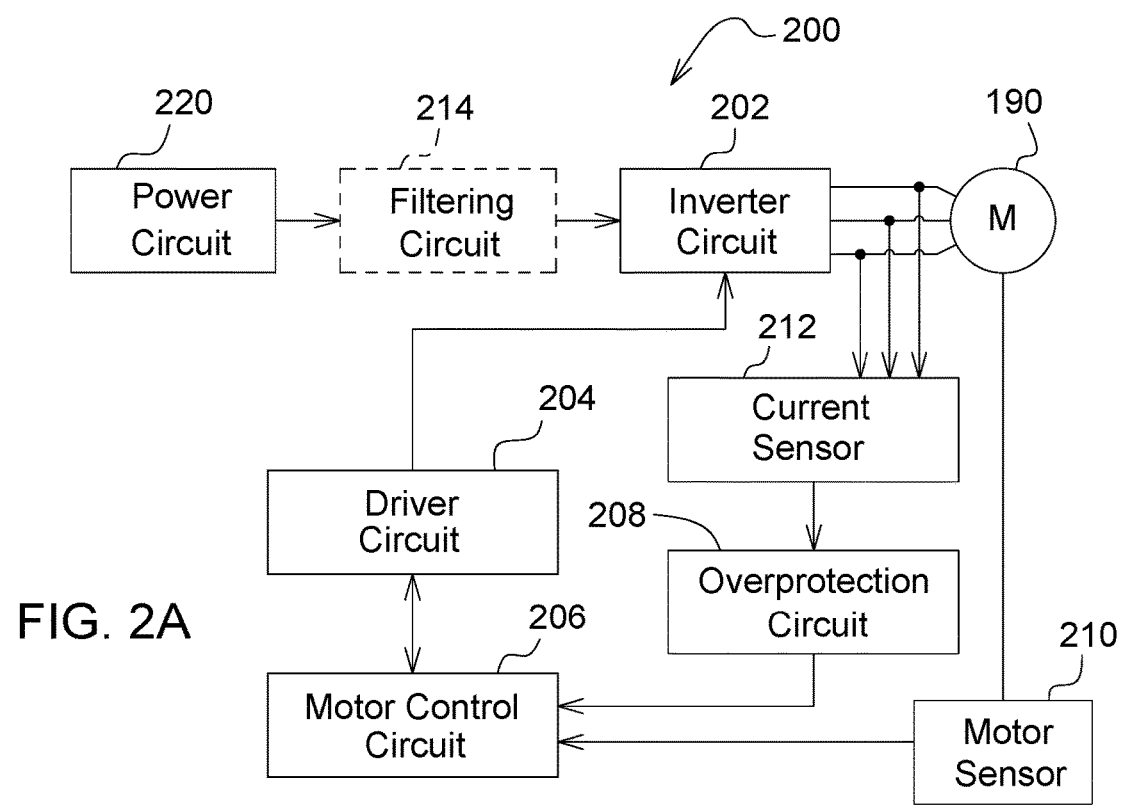
FIG. 2A is a schematic diagram of an control system for controlling the interconnection device of FIG. 1A according to an embodiment.
Figure 2B:
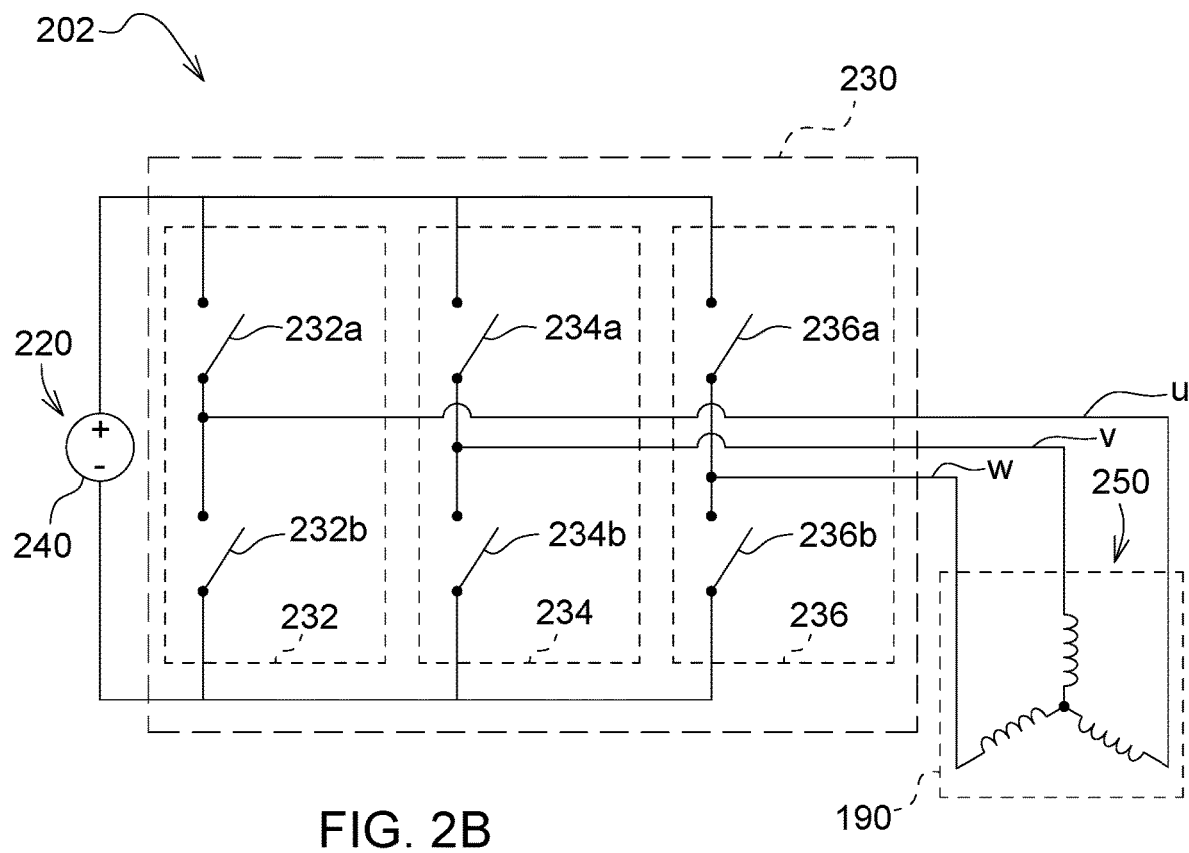
FIG. 2B is a schematic diagram of an inverter circuit arranged on the interconnection device of FIG. 1A according to an embodiment.

Referring to FIGS. 2A-2B, a control system 200 for controlling the motor 190 is shown according to an embodiment. In embodiments, the control system 200 can comprise a power circuit 220, which may include a DC power source, coupled to an inverter circuit 202, a motor control circuit 206, a driver circuit, and an overprotection circuit 208. In some embodiments, the control system 200 can optionally comprise a filtering circuit 214 electrically coupled between the power circuit 220 and the inverter circuit 202. The filtering circuit 214 can comprise smoothing capacitors, RC filters, or other suitable filtering components in various embodiments that operate to reduce unwanted noise and ripples in the DC power source generated by the power circuit 220.

In some embodiments, the inverter circuit 202 can comprise a switching circuit 230 arranged in parallel with a power source 240 (e.g., a DC power source) and operates to convert the DC input power to an AC output power for use by the motor 190. The switching circuit 230 can comprise a plurality of switching units (e.g., a first switching unit 232, a second switching unit 234, a third switching unit 236) each having one or more switching elements 232a, 232b, 234a, 234b, 236a, 236b arranged to generate the three-phase AC output power 250. In embodiments, the one or more switching elements 232a, 232b, 234a, 234b, 236a, 236b can comprise insulated gate bipolar transistors (IGBT), metal-oxide Field-Effect Transistors (MOSFET), Silicon Carbide MOSFETs, Silicon Carbide IGBTs, static induction transistors (SITs), combinations thereof, or other suitable switching devices.

As depicted in FIG. 2B, the first switching unit 232 comprises a first switching element 232a coupled in series with a second switching element 232b between the power source 240 and ground. A first phase output (e.g., U-phase) is supplied to an input terminal (e.g., motor pin connector 192a) of the motor 190 via the connection elements 145 arranged in the second connector assembly 144.

Similarly, the second switching unit 234 and the third switching unit 236, which include switching elements 234a, 234b, 236a, 236b arranged in series between the power source 240 and ground, are configured to provide the second and third phase outputs (e.g., V-phase and W-phase) to the corresponding input terminals (e.g., motor pin connectors 192b, 192c) of the motor 190 via the connection elements 145 arranged in the second connector assembly 144. Driver signals are applied to an input of each of the switching units 232, 234, 236 from the driver circuit 204. For example, the driver circuit 204 is configured to independently activate and deactivate each of the switching elements 232a, 232b, 234a, 234b, 236a, 236b in response to control signals received from the motor control circuit 206, or in response to overcurrent signals received from the overprotection circuit 208.

In some embodiments, the motor control circuit 206 can comprise an electronic data processor and other electronic circuitry as will be discussed in further detail with reference to FIG. 3. The motor control circuit 206 is arranged to receive input signals from the overprotection circuit 208 and the motor sensor 210, and is configured to compute and output position, speed, and torque commands to the driver circuit 204 for the control of the motor 190 based on the received signals. The overprotection circuit 208 can be coupled to a current sensor 212 that is configured to detect current applied to the motor windings and/or back electromotive force (EMF). In some embodiments, the overprotection circuit 208 can be configured to compare the detected current values received from the current sensor 212 to a predetermined threshold valve and generate a corresponding output signal to the driver circuit 204. For example, if an overcurrent condition is detected (i.e., the current value exceeds the threshold value), the overprotection will generate an output signal that interrupts the operation of the inverter circuit 202 via the driver circuit 204.

In some embodiments, a motor sensor 210 (see FIG. 4) can be centrally arranged on the second surface 448 of the substrate 404 in coaxial alignment with the shaft 194. In some embodiments, the motor sensor 210 can comprise a position sensor, resolver, or encoder that is associated with the shaft 194 or the rotor. The motor sensor 210 can be coupled to the motor control circuit 206 to provide feedback data (e.g., current feedback data, such as phase current values $i_u$, $i_v$ and $i_w$), raw position signals, among other possible feedback data or signals, for example. Other possible feedback data includes, but is not limited to, winding temperature readings, semiconductor temperature readings of the inverter circuit 202, three phase voltage data, or other thermal or performance information for the motor 190.

In other embodiments, the motor sensor 210 can comprise a speed sensor that is configured to estimate at least one of an angular position of the shaft 194, a speed or velocity of the shaft 194, and a direction of rotation of the shaft 194. In some embodiments, the motor sensor 210 may be coupled to an analog-to-digital converter (not shown) that converts analog raw position data or velocity data to digital raw position or velocity data, respectively.

Figure 3:
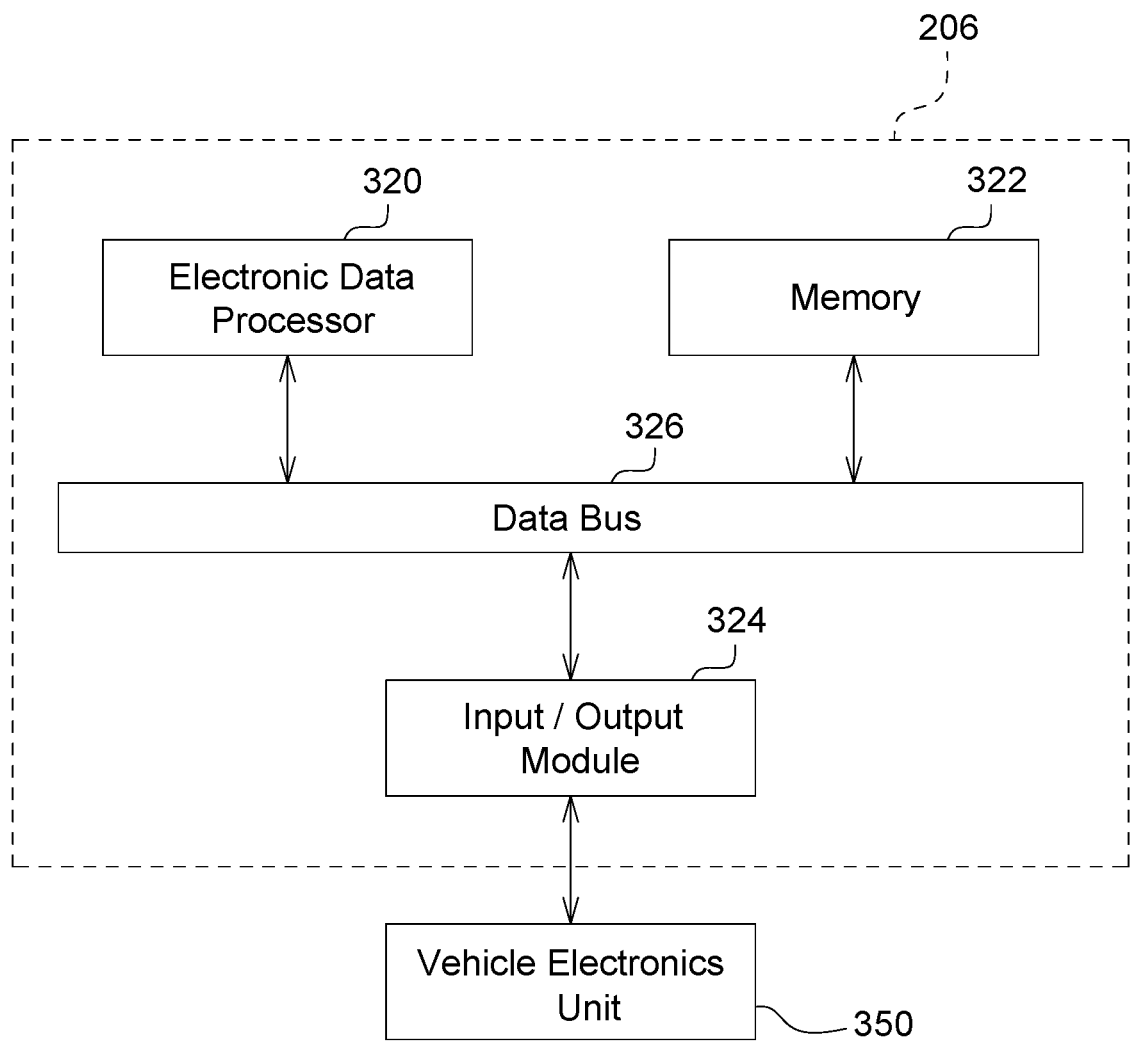
FIG. 3 is a block diagram of a motor control circuit arranged on the interconnection device of FIG. 1A according to an embodiment.

Referring to FIG. 3, a block diagram of the motor control circuit 206 is shown according to an embodiment. In embodiments, the motor control circuit 206 can comprise an electronic data processor 320, memory 322, an input/output module 324 communicatively coupled to a data bus 326, which support communications of data between or among the electronic data processor 320, memory 322 and an input/output module 324.

The electronic data processor 320 can comprise a microprocessor, a microcontroller, a programmable logic array, a logic circuit, an arithmetic logic unit, an application specific integrated circuit, a digital signal processor, a proportional-integral-derivative (PID) controller, or another data processing device.

The memory 322 can comprise any magnetic, electronic, or optical device for storing data (e.g., position data, sensor data, current data, voltage data, etc.) and software instructions that are executed by the electronic data processor 320. The electronic data processor 320 controls the operations of the control system 200 based on the executed instructions. For example, in response to the executed instructions, the electronic data processor 320 generates control signals that control the switching elements 232a, 232b, 234a, 234b, 236a, 236b arranged in the inverter circuit 202 to drive the motor 190. In various embodiments, the memory 322 can comprise an electronic data storage device, an electronic memory, non-volatile electronic random access memory, one or more electronic data registers, data latches, a magnetic disc drive, a hard disc drive, an optical disc drive, or the like.

The input/output module 324 provides an interface between various input and output devices (e.g., driver circuit 204, switching elements 232a, 232b, 234a, 234b, 236a, 236b, sensors 210, 212). In embodiments, the input/output module 324 can comprise a plurality of data interfaces. Each data interface can comprise a transceiver and buffer memory, for example. In some embodiments, each data interface can include any serial or parallel input/output port. Additionally, in some embodiments, the input/output module 324 can further comprise an analog to digital converter (not shown) that is configured to convert the phase current values of the motor 190 to digital values for transfer to the electronic data processor 320 via the data bus 326.

In other embodiments, the vehicle electronics unit 350 can be configured to transmit speed and or torque commands to the motor control circuit 206 through the input/output module 324 and the data bus 326. For example, the vehicle electronics unit 350 may provide data messages such as speed or torque commands via the input/output module 324. Such commands may also be generated by a vehicle operator via a user interface, such as, e.g., a throttle, a pedal, a controller, or other suitable input devices.

Figure 4:
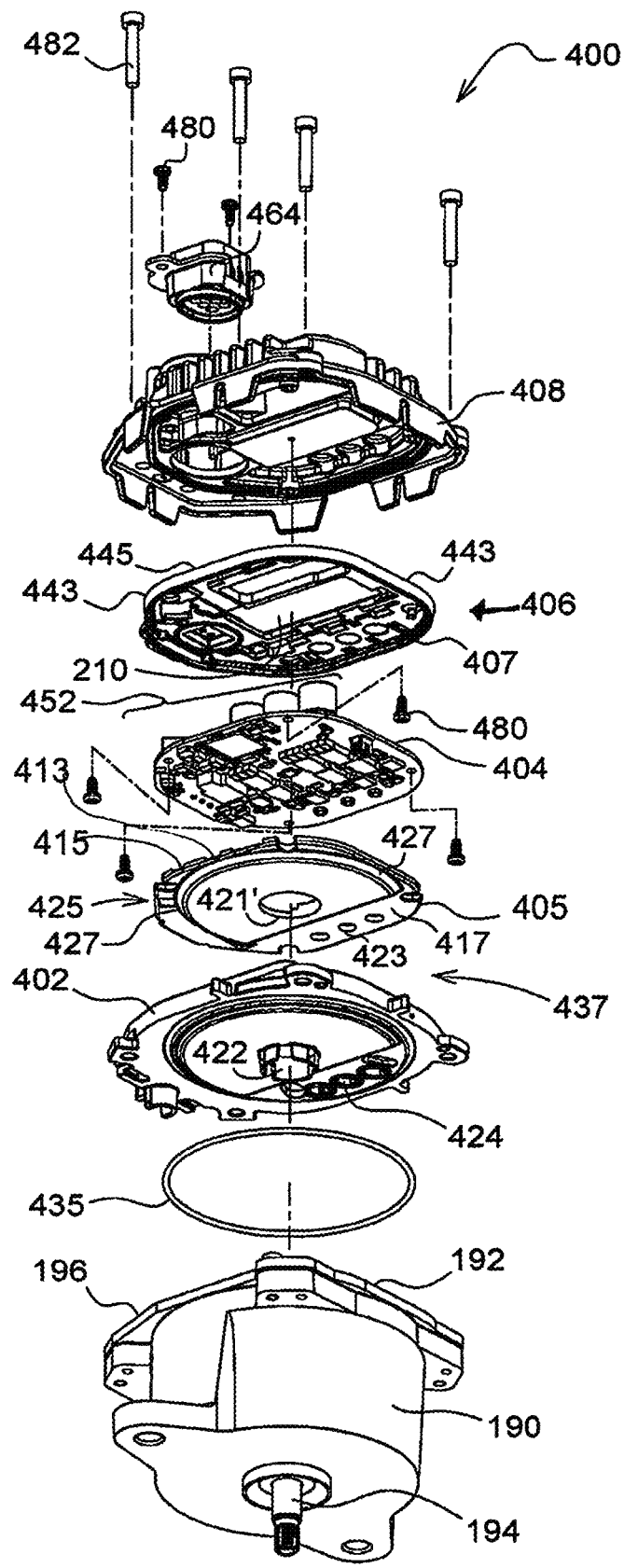
FIG. 4 is an exploded perspective view of an interconnection device according to an embodiment.

Referring now to FIG. 4, an interconnection device 400 is shown according to an embodiment. The interconnection device 400 is substantially similar to interconnection device 100, therefore like reference numerals will be used to designate similar features and such features will not be discussed in detail. In embodiments, the interconnection device 400 can further comprise a thermal protection barrier (i.e., a barrier device) 406 having a first isolation element 405 and a second isolation element 407 arranged on opposing sides of the substrate 404. Such an arrangement is particularly advantageous in that it not only provides a thermal isolation barrier between the motor 190, but it also prevents thermal crosstalk of the motor 190 and the integrated electronic circuitry 452 arranged on substrate 404. It should be further noted that the collective and relative arrangement of the first isolation 405 and the second isolation element 407 with respect to the substrate 404 provides vibrational damping. This, in turn, helps to increase device reliability, device performance, sensing accuracy, and product lifetime.

As depicted, the first isolation element 405 can be arranged to provide a first protective barrier between the substrate 404 and the base assembly 402. In some embodiments, the first isolation element 405 can comprise an upper portion 415 integrally formed with a lower portion 417. The upper portion 415 can comprise a planar surface 413 having a plurality of connector apertures 423 and at least one shaft aperture 421 formed therein that are similarly arranged as a first receiving apertures 422 and a second receiving apertures 424 of the base assembly 402. For example, the plurality of connector apertures 423 and the at least one shaft aperture 421 can be coaxially aligned with the first receiving apertures 422 and the second receiving apertures 424 arranged on the base assembly 402. Additionally, in some embodiments, similar to the first and second receiving apertures 422, 424, the plurality of connector apertures 423 and the at least one shaft aperture 421 can be arranged in offset relation to one another. The lower portion 417 can comprise an outer wall structure 425 defined by wall members 427 that is sized generally smaller than an outer circumference of the upper portion 415 such that a periphery edge of the lower portion 417 is inwardly offset from a periphery edge of the upper portion 415 as shown in FIG. 4. In some embodiments, the first isolation element 405 can comprise a ventilation element 437, for example, an air vent such as a Gore-Tex vent, which allows the interconnection device to be vented to atmosphere and also allows for the interconnection device to be tested and for sufficient creepage and clearance distances to be maintained.

In some embodiments, the interconnection device 400 can further comprise a sealant member 435 (e.g., an O-ring) that can be arranged to form an air tight seal between the base assembly 402 and the mounting surface 196 of the motor 190 to provide water ingress protection while also simultaneously providing damping of unwanted vibrations.

The second isolation element 407 can be arranged to provide a second protective barrier between the substrate 404 and the cover apparatus 408. In some embodiments, the second isolation element 407 will have a plurality of openings 445 that are defined by raised structures, which are sized to receive and accommodate the connection elements 443 and the various electronic components of the integrated electronic circuitry 452 arranged on substrate 404. In various embodiments, each of the first isolation element 405 and the second isolation element 407 can comprise an insulating material (e.g., dielectric material).

Figure 5A:
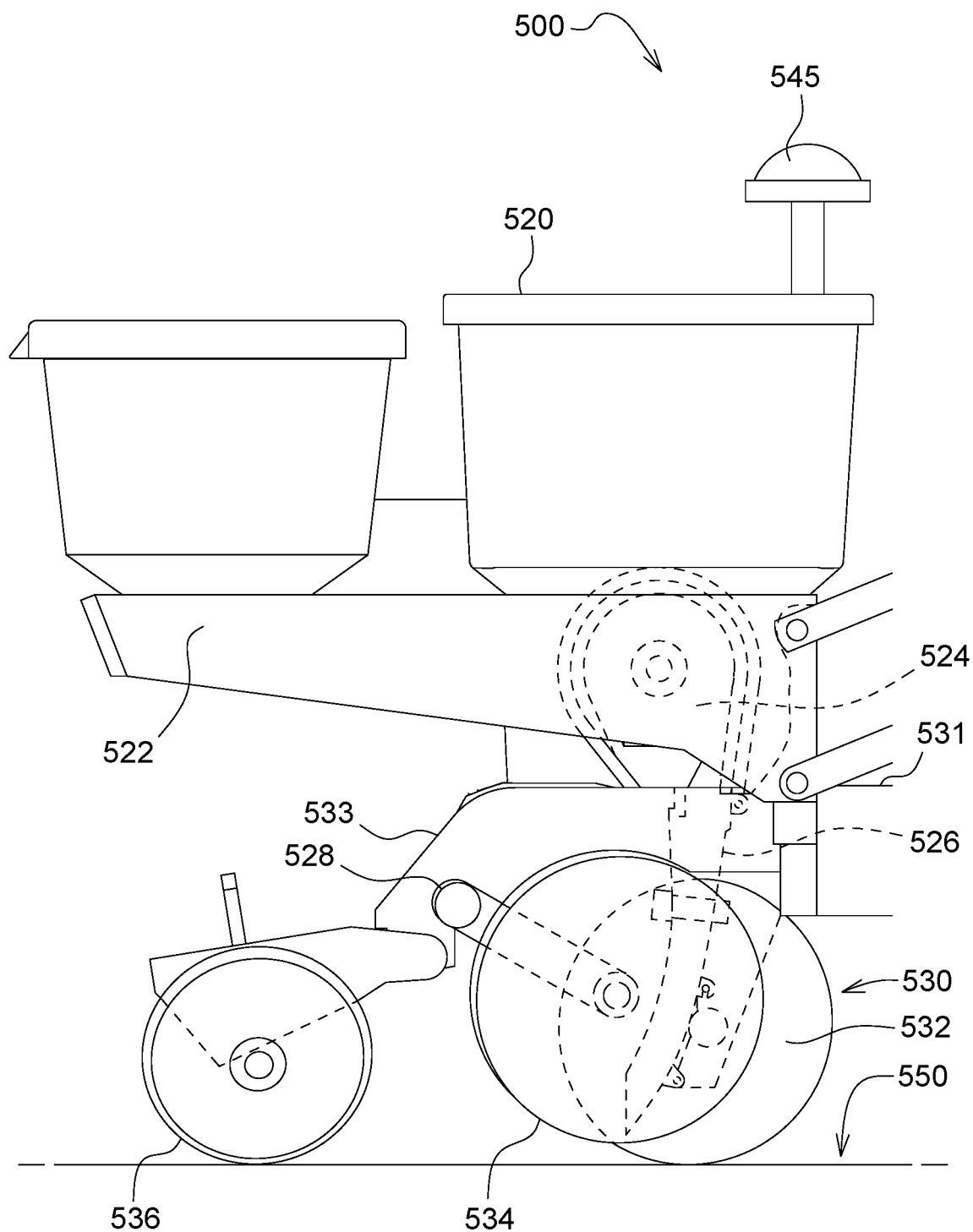
FIG. 5A is an illustration of a planter unit in which the interconnection device of FIGS. 1A and 4 may be incorporated.
Figure 5B:
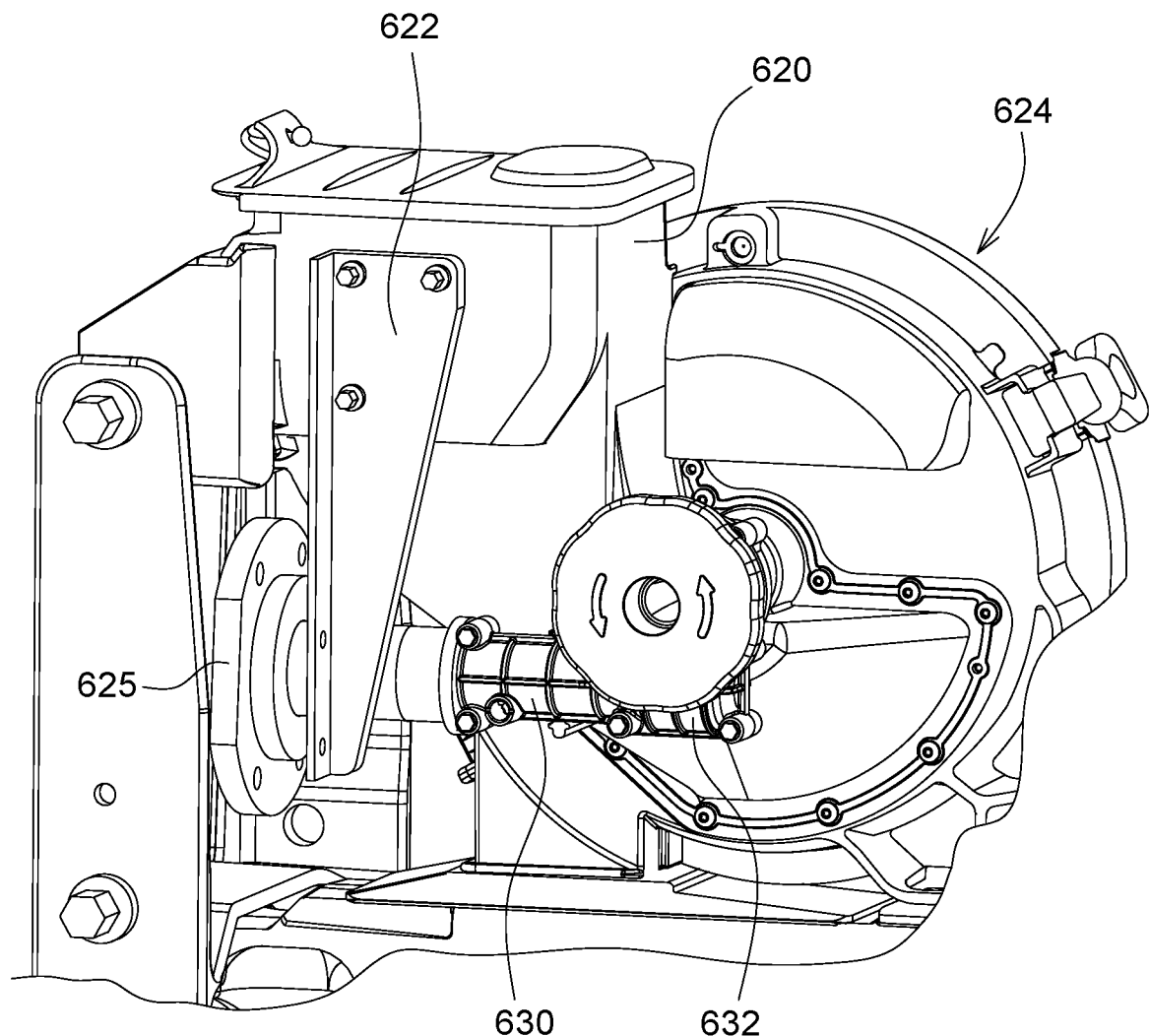
FIG. 5B is an illustration of the interconnection device of FIG. 1A coupled to a metering unit arranged in the planter unit of FIG. 5A according to an embodiment.
Figure 5C:
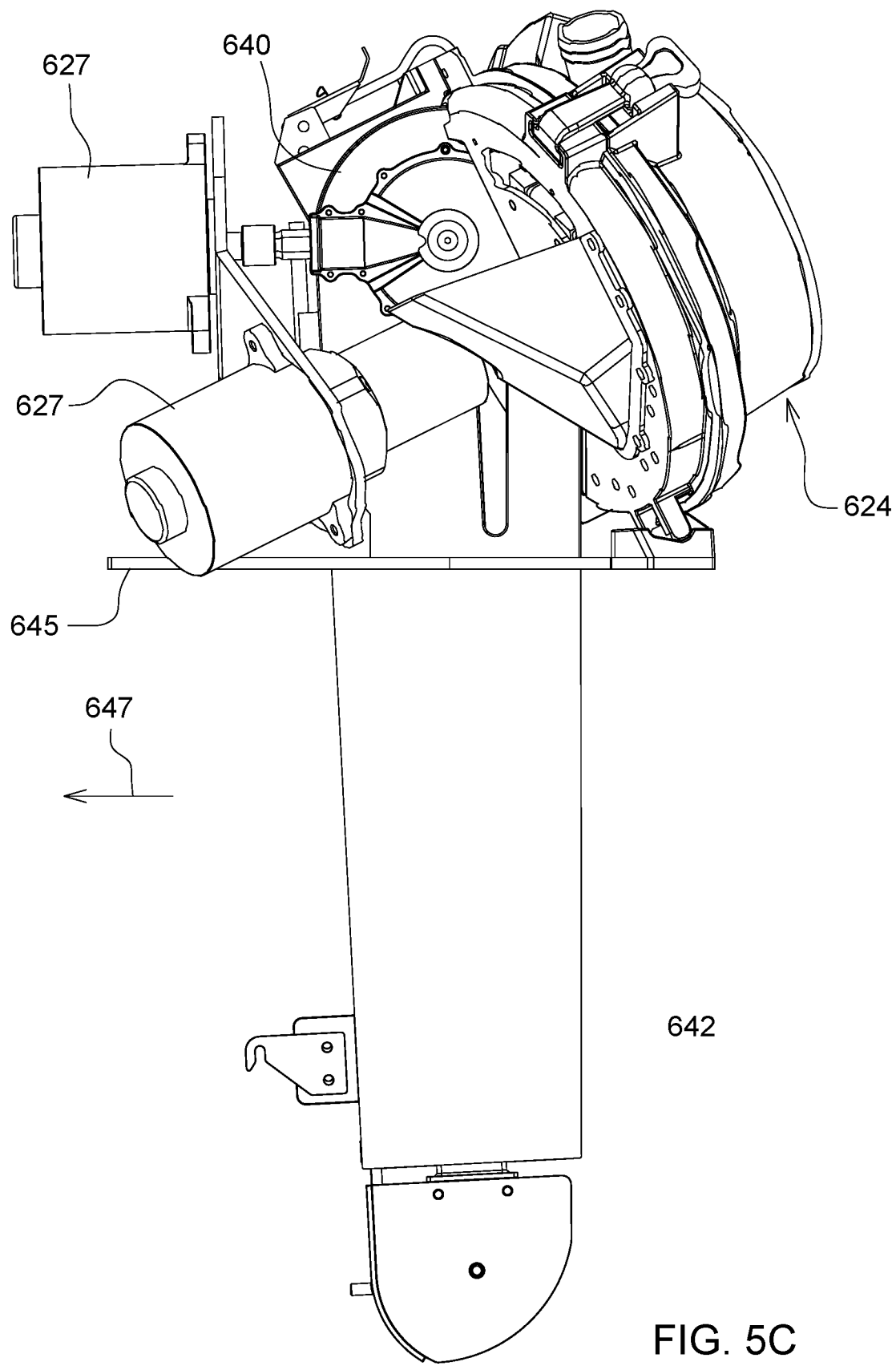
FIG. 5C is an illustration of the interconnection device of FIG. 1 coupled to a metering unit and a brush belt assembly arranged in the planter unit of FIG. 5A according to an embodiment.

Referring to FIGS. 5A-5C, the interconnection device 100 or 400 coupled to the motor 190 is shown in use with the planter unit 500. Although the interconnection device 100 or 400 is depicted as being incorporated into planter unit 500, it should be noted that, in other embodiments, the interconnection device 100 or 400 may be incorporated into other agricultural applications, such as air seeding, chemical metering, and others. In embodiments, the planter unit 500 can comprise a hopper 520 arranged in a generally upright position and mounted to a first frame 522. A metering unit 524 having a generally circular configuration can be arranged beneath hopper 520 and can be configured to distribute seeds received from hopper 520 into a seed tube 526. For example, the metering unit 524 can be configured to singulate seed received from the hopper 520 for delivery to the seed tube 526. The seed tube 526 directs the seeds received from the metering unit 524 to a soil opening 540 formed in the soil 550 by a ground engaging device 530. In some embodiments, ground engaging device 530 can comprise at least one opener disc 532 that is rotatable about a center axle and arranged to form the soil opening 540, whereas, in other embodiments, two or more opener discs may be utilized according to design and/or specification requirements.

An extension bar 531 may be configured to operate (i.e., lower and raise) collectively with a height adjusting arm 528, the operation of which is controlled by a user such as a vehicle operator. The height adjusting arm 528 can be operably coupled to at least two gauge wheels 534 mounted proximate the ground engaging device 530 and may be configured to regulate the penetration depth of ground engaging device 530 via the height adjusting arm 528. For example, the height adjusting arm 528 enables the vertical position of the gauge wheels 534 to be adjusted relative to the ground engaging device 530, which establishes the depth at which the ground engaging device 530 is inserted into the soil 550 (i.e., the depth of the soil opening). To vertically adjust the gauge wheels 534, the height adjusting arm 528 having a lower bearing surface 529 engages against at least one of the gauge wheels 534 and is secured to a second frame 533 by a bracket 527.

A closing wheel assembly 536 can be arranged following of the gauge wheels 534 and is operable to close the soil opening 540 formed by ground engaging device 530. In some embodiments, planter unit 500 may further comprise a location-determining receiver 545, such as a satellite navigation receiver, that is mounted to the planter unit 500 and configured to provide field location data.

In FIG. 5B, an alternative hopper and metering unit arrangement is shown. As depicted in FIG. 5B, a hopper 620, which can include a mini hopper, is mounted to the side of a metering unit 624. The metering unit 624 can be driven by a control device 625, which can include the motor 190 having either the interconnection device 100 or 400 mounted thereto, that is mounted to the hopper 620 via a bracket 622. In some embodiments, the motor 190 of the control device 625 can be connected to a drive input 630 of a gearbox 632. Such an arrangement provides a control interface directly to the metering unit 624. For example, use of dedicated control devices 625 enables the speed of each metering unit to be adjusted as the path of the planter changes to maintain the desired seed spacing for each row of the planter.

In other embodiments, the planter unit 500 can further comprise a delivery system 640 that is associated with the metering unit 624. The delivery system 640 can comprise a housing 642 having a brush belt assembly (not shown) mounted thereto. At least one second control device 627 can be coupled to the delivery system 640 as shown in FIG. 5C. A mounting bracket 645 that is coupled to a row unit frame such as the frame 522 can be arranged to support the metering unit 624, the delivery system 640, and the one or more control devices 627. As depicted, in operation, the metering unit 624 and the delivery system 640 are adapted to move through a field in the direction indicated by the arrow 647.

As previously discussed with reference to FIGS. 2A and 3, in operation, the control device 625 can be automatically controlled via the control system 200 arranged on the interconnection device 100. For example, data commands can be sent to each individual control device 625 via a vehicle electronics unit or based an input received via an operator interface, which can be arranged in a cab of an agricultural vehicle. Additionally, in some embodiments, alarm and alert signals can be generated for display on the operator interface based on feedback signals generated by the overprotection circuit 208 and/or the motor sensor 210.

Without in any way limiting the scope, interpretation, or application of the claims appearing below, a technical effect of one or more of the example embodiments disclosed herein is a barrier device for an electrical connector. The present disclosure overcomes the limitations of the prior art by providing a thermal isolation barrier, as well as thermal crosstalk reduction to optimize signal performance. Additionally, the barrier device provides for a simplistic design and scalable architecture that is cost efficient and which can be optimally adapted for a wide variety of applications and power requirements.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A barrier device for an electrical connector, the barrier device comprising:
   a first barrier element interposedly arranged between a substrate and a base assembly of the electrical connector; and
   a second barrier element arranged for mating engagement with an upper surface of the substrate of the electrical connector, the second barrier element comprising a plurality of openings defined by a plurality of protruding structures that are configured and arranged to accommodate electronic components mounted to the upper surface of the substrate,
wherein at least the first barrier element and the second barrier element form a thermal protection barrier around the substrate.

2. The barrier device of claim 1, wherein the first barrier element and the second barrier element respectively form isolation barriers to facilitate thermal crosstalk reduction between the electrical connector and a corresponding electric machine coupled thereto.

3. The barrier device of claim 1, wherein the first barrier element is symmetrically aligned with the second barrier element.

4. The barrier device of claim 1 further comprising a sealant member, wherein the sealant member is sized and shaped for removable insertion into a peripheral channel formed on at least one surface of the base assembly.

5. The barrier device of claim 4, wherein the sealant member is arranged to form a leakage barrier to provide water ingress protection.

6. The barrier device of claim 4, wherein the sealant member is arranged to form a damping mechanism configured to dampen vibrational forces acting on the electrical connector.

7. The barrier device of claim 1 further comprising a ventilation element arranged on at least one surface of the first barrier element or the second barrier element.

8. The barrier device of claim 1, wherein each of the first barrier element and the second barrier element comprises an insulating material.

9. The barrier device of claim 1 further comprising a cover apparatus that is arranged to provide a heat transfer path for the electrical connector.

10. The barrier device of claim 9, wherein the first barrier element and the second barrier element respectively form isolation barriers to facilitate thermal crosstalk reduction between the electrical connector and a corresponding electric machine coupled thereto.

11. The barrier device of claim 9 further comprising a ventilation element arranged on at least one surface of the first barrier element or the second barrier element.

12. The barrier device of claim 9, wherein each of the first barrier element and the second barrier element comprises an insulating material.

13. The barrier device of claim 9 further comprising a cover apparatus that is arranged to provide a heat transfer path for the electrical connector.

14. The barrier device of claim 1, wherein the first barrier element is on a first surface of the substrate and the first surface and the upper surface are different surfaces of the substrate.

15. The barrier device of claim 14, wherein the first barrier element is a barrier between substrate and the base assembly and the second barrier element is a barrier between the substrate and a cover.

16. A barrier device for an electrical connector, the barrier device comprising:
    a first barrier element interposedly arranged between a substrate and a base assembly of the electrical connector;
    a sealant member, wherein the sealant member is sized and shaped for removable insertion into a peripheral channel formed on at least one surface of the base assembly; and
    a second barrier element arranged for mating engagement with an upper surface of the substrate of the electrical connector, the second barrier element comprising a plurality of openings defined by a plurality of protruding structures that are configured and arranged to accommodate electronic components mounted to the upper surface of the substrate,
    wherein at least the first barrier element and the second barrier element form a thermal protection barrier around the substrate.

17. The barrier device of claim 16, wherein the sealant member is arranged to form a leakage barrier to provide water ingress protection.

18. The barrier device of claim 16, wherein the sealant member is arranged to form a damping mechanism configured to dampen vibrational forces acting on the electrical connector.

19. The barrier device of claim 16, wherein the first barrier element is on a first surface of the substrate and the first surface and the upper surface are different surfaces of the substrate.

20. A method, the method comprising:
    arranging a first barrier element on a first side of a substrate;
    arranging a second barrier element on a second side of the substrate, the second side of the substrate being opposite that of the first side of the substrate;
    aligning a plurality of connection elements and apertures arranged on or formed in the first barrier element and the second barrier element with one or more circuit components respectively arranged on the first side and second side of the substrate; and
    mating at least one of the first barrier element or the second barrier element with an upper surface of an electric machine.

* * * * *